April 23, 1957

J. M. CUMMING ET AL 2,789,505

LIQUID PROPELLENT ROCKET

Filed Aug. 23, 1951

INVENTORS
JAMES M. CUMMING
GEORGE P. SUTTON
VERNON R. VORWERK
DARELL B. HARMON
CHARLES A. VILLIERS

BY

William R. Lane

ATTORNEY

April 23, 1957 J. M. CUMMING ET AL 2,789,505
LIQUID PROPELLANT ROCKET
Filed Aug. 23, 1951 4 Sheets-Sheet 2

INVENTORS
JAMES M. CUMMING
GEORGE P. SUTTON
VERNON R. VORWERK
DARELL B. HARMON
CHARLES A. VILLIERS
BY William R. Lane
ATTORNEY INVENTORS
JAMES M. CUMMING
GEORGE P. SUTTON
VERNON R. VORWERK
DARELL B. HARMON
CHARLES A. VILLIERS BY William R. Lane
ATTORNEY

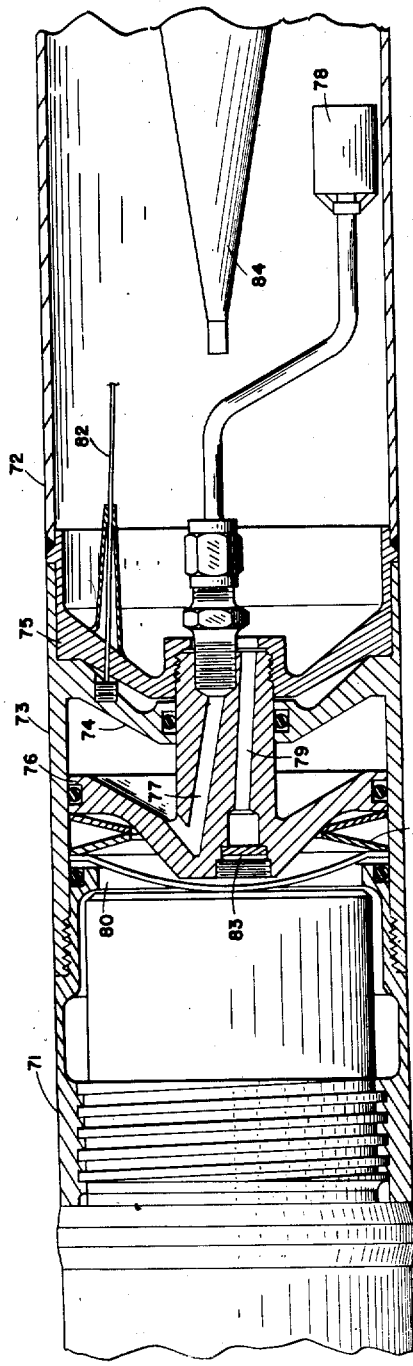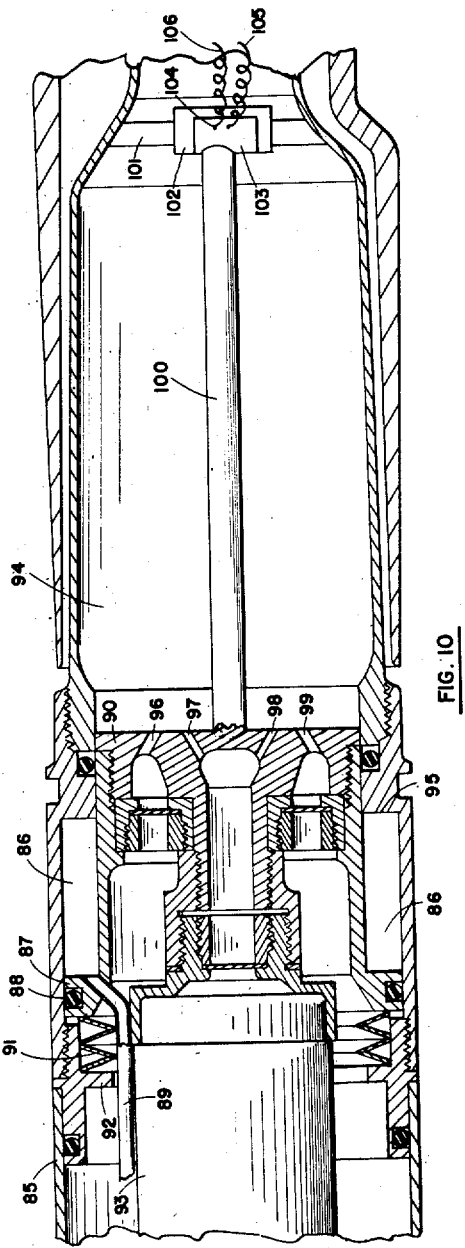

United States Patent Office 2,789,505
Patented Apr. 23, 1957

2,789,505

LIQUID PROPELLENT ROCKET

James M. Cumming, San Marino, and George P. Sutton, Vernon R. Vorwerk, and Darell B. Harmon, Los Angeles, Calif., and Charles A. Villiers, East Paterson, N. J., assignors to North American Aviation, Inc.

Application August 23, 1951, Serial No. 243,338

18 Claims. (Cl. 102—49)

This invention pertains to artillery rockets and particularly to artillery rockets utilizing liquid propellants.

The space and weight limitations on a small artillery rocket require that whatever scheme is used for feeding propellants to the combustion chamber of the rocket motor be of utmost simplicity, of light weight, and of minimum displacement. In order to attain the range required, all possible space not occupied either by the warhead or the rocket motor must be used to contain propellant. Since the propellant must be delivered to the rocket motor very rapidly, some system must be devised which applies rapidly a relatively large amount of energy to the delivery of propellant to the injectors. In large rocket propelled devices relatively heavy turbine-driven pumps are employed for this purpose. Such an expedient is unsuitable, especially in a small rocket, however, because of the weight of such pumps. In larger rocket devices it has also been feasible to store energy in the form of highly compressed gases which, upon release, pressurize the interior of the propellant tanks in order to force the contents thereof into the combustion chamber. However, the storage of such gases at high pressure necessitates relatively heavy, thick-walled containers which have no capacity for containing propellant, and hence represent wasted space in the missile. This solution, then, must be eliminated, both because of the added weight and because of the wasted space involved. This invention contemplates the efficient utilization of the energy contained in the propellants themselves for the purpose of pressurizing the propellants and forcing them into the combustion chamber of the rocket motor. By timely combination of these propellants in limited amounts and under controlled conditions the energy thereof is quickly released when pressurization is required, and the propellants themselves are theretofore stored at pressures low enough not to require increased tank wall thickness. It is therefore an object of this invention to provide a liquid propelled rocket of maximum total impulse-to-weight ratio.

It is another object of this invention to provide a liquid propelled rocket wherein the potential energy of the propellants is partially released to provide pressurization thereof.

Another object of this invention is to provide apparatus adapted to generate gases from the reaction of small amounts of liquid propellants in order to pressurize the main rocket propellants and feed them to the rocket motor.

It is another object of this invention to provide a liquid propelled rocket which may be stored in ready condition for extended periods of time.

It is another object of this invention to provide in combination with a rocket motor an improved device for storing liquid propellants, and means for releasing the potential energy of a small amount of said propellants for the purpose of feeding said propellants rapidly into said rocket motor.

It is another object of this invention to provide a liquid propellent rocket incorporating light weight means for pressurizing the propellants characterized by requiring a minimum of space.

It is another object of this invention to provide means for pressurizing rocket motor propellant tanks in a minimum time.

It is a further object of this invention to provide a liquid propellent rocket with propellent storage means of minimum weight and space.

It is a further object of this invention to provide a propellent feed system for a rocket motor having a single rigid cylindrical tank filled with one propellant and a flexible bag within the tank containing the other propellant.

Other objects of invention will become apparent from the following description taken in connection with the accompanying drawings in which, Fig. 1 is an elevational view of the invention;

Fig. 3 is an enlarged sectional view of a portion of the device shown in Fig. 2;

Fig. 4 is an enlarged sectional view of a portion of the injector shown in Fig. 2;

Fig. 5 is an enlarged end view of a portion of the device shown in Fig. 4 taken at 5—5;

Fig. 6 is a sectional view of the device shown in Fig. 5 taken at 6—6 in Fig. 5;

Fig. 7 is a sectional view of a second embodiment of the invention;

Fig. 9 is a sectional view of a fourth embodiment of the invention;

Fig. 10 is a sectional view of a fifth embodiment of the invention; and

As noted above, the basic idea of this invention is to utilize a portion of the stored energy in the propellants themselves, or in fluid having the characteristics of propellants, for the purpose of pressurizing the propellant tanks. The propellants themselves are stored in substantially concentric containers, the inner of which is adapted to withstand nominal fluid pressure, and is not rigid; while the outer tank forms the body of the missile and is adapted to withstand relatively high internal pressure. It may be appreciated that following the teaching of this invention, many ways may be devised for burning a small amount of the missile's fuel and oxidizer supply for the purpose of releasing pressurization energy. Accordingly the following examples or embodiments of the invention are presented as illustrations of the basic invention in various differing physical forms.

Figure 1:
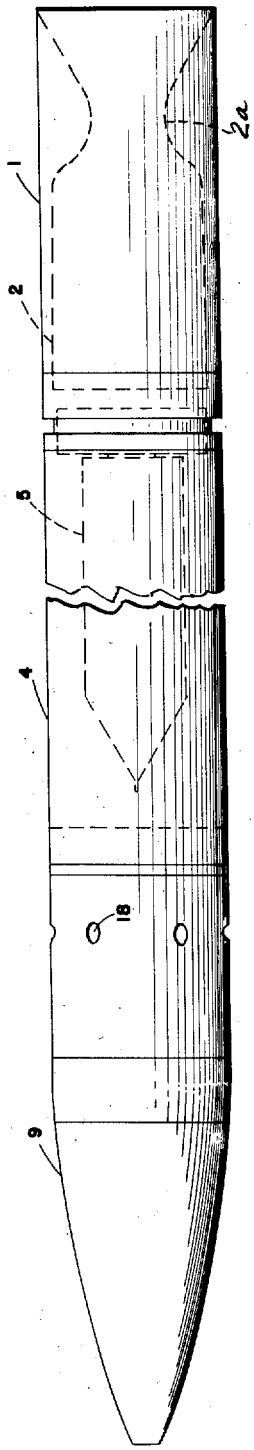
Figure 2:
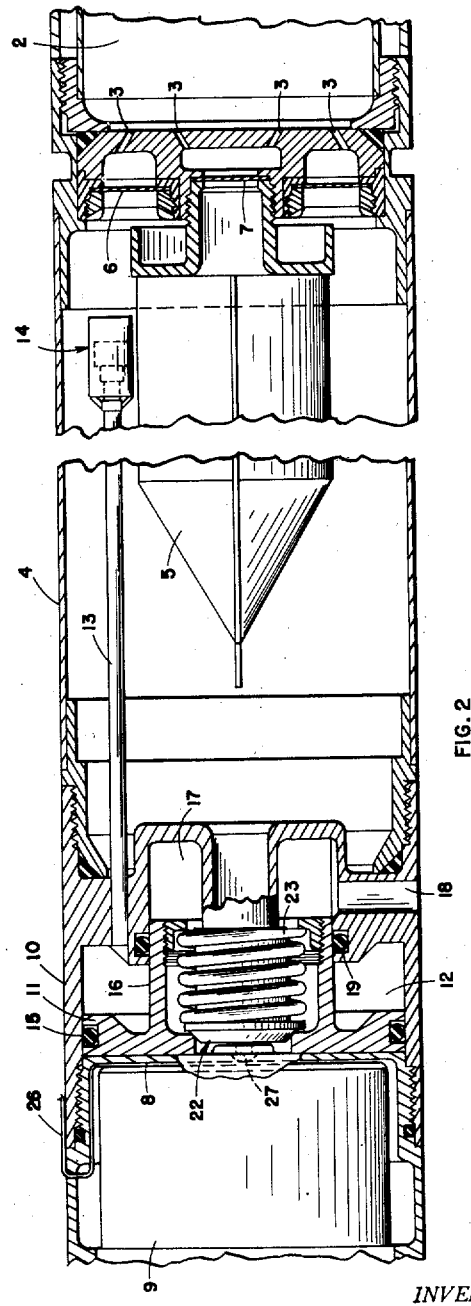
Fig. 2 is a detailed sectional view of the device shown in Fig. 1.

Referring to Figs. 1 and 2, a missile is shown comprising a rocket motor 1 having a combustion chamber 2 and a nozzle or throat section 2a, the forward end of which includes a number of injector orifices 3 through which fuel and oxidizer are admitted to the combustion chamber. Propellants for the rocket motor are contained in cylindrical tank 4 and in flexible bag 5 within tank 4. One propellant is contained in the space within cylindrical tank 4 and outside bag 5, while the other propellant is contained within bag 5. This invention is suited for use with a wide variety of liquid propellants of which an example combination is white fuming nitric acid and turpentine. The propellent combination may be hypergolic, i. e., self-igniting at ambient temperature and pressure upon contact or mixture, or it may require separate ignition. Burst diaphragm 6 separates the contents of tank 4 from injector orifices 3, while circular burst diaphragm 7 separates the contents of bag 5 from injector orifices 3. These burst diaphragms are constructed of thin metal or plastic, and are designed to burst at a predetermined critical pressure. Burst diaphragm 6 may be continuous and of annular shape; or, alternatively, a multiplicity of small circular burst diaphragms such as burst diaphragm 7 may be provided. These frangible burst diaphragms are made of such a thickness that when the tank is fully pressurized they rupture, allowing free flow of fluid from the tank and bag into combustion chamber 2. Flexible bag 5 may conveniently be made of polytrifluoromonochloroethylene, manufactured under the trade name "Kel-F." Kel-F is particularly suited to contain the more active of the propellant pair chosen; for instance, in the above illustration of turpentine and white fuming nitric acid it is expedient to contain the acid in the flexible bag. Stainless steel or other corrosion-resistant materials may also be used as material for bag 5, depending upon the corrosive characteristics of the propellants chosen. The main advantages of this arrangement for containing the two propellants are that only the outer tank wall need be rigid and of such tensile strength as to withstand hoop stresses due to the internal pressure required to force the propellants into the rocket motor combustion chamber, and that the flexible bag may be tightly sealed before assembly of the rocket, thus allowing for storage of the missile for extended periods of time, in ready condition, without danger of leakage or combustion of the propellants because of intermixture.

Having provided an efficient structure for storing the propellants and for withstanding pressurization forces, there now remains the problem of providing a source for the pressure needed to pressurize the interior of tank 4 and bag 5. As previously stated, this invention contemplates the utilization of the stored energy of propellants themselves as a source of pressurization energy. In addition, this invention contemplates a variety of different arrangements provided for the purpose of releasing the energy of a limited amount of the propellants for pressurizing the tanks. The particular arrangement of these latter devices chosen is dependent, at least in part, upon the choice of propellants for the missile.

In the forward end of tank 4 is situated a bulkhead 8 separating the warhead 9 from the contents of tank 4. A cylindrical chamber 10 containing a piston 11 and liquid hypergol 12 is situated just aft of bulkhead 8. The interior of cylinder 10 communicates with the interior of tank 4 through conduit 13 to which is attached injector 14 near the rocket motor injector. Piston 11 is sealed to the wall of cylinder 10 by O ring 15, and is normally in the position shown in Fig. 2 before firing of the missile. Piston 11 is integrally attached to smaller piston 16, which is free to slide in annular chamber 17. The walls of annular chamber 17 are attached to the walls of tank 4, and chamber 17 is vented to the atmosphere through port 18. Chamber 17 is sealed by sliding engagement of piston 16 with O ring 19. Piston 11 includes a small open-ended chamber 20a at its forward end, separated from the contents of tank 4 by burst diaphragm 21 and powder chamber 20 shown in Fig. 3. The pressure in powder chamber 20 is limited by action of spring-loaded pressure regulator 22, shown in seated position against piston 11. Pressure regulator 22 is held in this seated position by compression spring 23, and is free to slide against the force of the spring in annular chamber 17, being sealed by O ring 24. Powder chamber 20 contains heating element 25 connected at one end to the structure of the missile, and at the other end to conductor 26 brought out through rivet 27 and thence to the exterior of the missile.

Referring to Figs. 4–6, an enlarged view of injector 14 is shown in Fig. 4. Injector 14 is surrounded by its shield 14a and through which extends conduit 13. Injector nozzle 13a, having orifices 13b, is secured on conduit 13. Burst diaphragm 28 seals orifices 13b and is held in place by cap 13c. Diaphragm 28 is shown in its blown-out position in broken lines.

In Figs. 5 and 6, weakening groove 28a in diaphragm 28 is illustrated. It is cut to the proper depth according to the pressure at which it is required to burst.

In operation the device functions as follows: Collapsible bag 5 is filled with one of the missile propellants attached to the injector bulkhead as shown in Fig. 2, and sealed by seam welding or any other means suitable for the material of which the bag is constructed. The chamber of cylinder 10 is filled with some fluid 12, hypergolic with the propellant contained in tank 4, with all components of the device in the positions shown in Fig. 2. A powder charge is placed in chamber 20 and is ignited by the passage of electrical current through heating element 25. Ignition of this powder charge causes an initial movement of piston 11 aft, i. e., to the right in Fig. 2. This movement of piston 11 displaces fluid 12 and causes it to flow through conduit 13 and to rupture burst diaphragm 28 in the end of injector 14, shown in Fig. 4. Immediately upon contact of fluid 12 with the propellant in tank 4, ignition occurs, causing rapid generation of gas. Tank 4 is therefore pressurized internally, and since the walls of collapsible bag 5 are not rigid, the same pressure is transmitted to the fluid therein contained. Flow of propellants through injector orifices 3 is therefore begun, and the rocket motor may be fired either by spontaneous combustion of the propellants or by a separate firing device (not shown). The pressure generated by combustion of fluid 12 with the propellant contained in tank 4 is transmitted to chamber 20a through burst diaphragm 21 which ruptures when this pressure exceeds a critical value. Full pressure as contained in tank 4 is therefore transmitted to the forward face of piston 11. Since chamber 17 is vented to the atmosphere through port 18, an unbalanced force is exerted upon the piston directed to the right in Fig. 1, causing piston 11 to travel, expelling more of fluid 12 into the interior of tank 4 and further increasing pressure in tank 4. If the pressure in tank 4 exceeds a safe value for the tank, relief is afforded by movement of regulator valve 22 against compression spring 23 which is chosen to provide just sufficient force so that any excess pressure over what may safely be withstood by tank 4 is vented to chamber 17 and thence to the atmosphere through port 18. It should be pointed out that the device may function satisfactorily without use of regulator 22 because of the stable nature of the system. Stability is inherent because, although flow of hypergol 12 into tank 4 is increased by increased pressure on piston 11, the increase is less than linear, and flow is not proportional to pressure because of the orifice in injector 14. Travel of piston 11 continues to the right until all of the contents of cylinder 10 are expelled into tank 4. Tank 4 and collapsible bag 5 are therefore very quickly pressurized at the expense of only a small quantity of fluid 12 and of the propellant contained in tank 4. A relatively small space is occupied by piston 11 and its associated parts, with the only wasted space being that in chamber 17 vented to the atmosphere. Chamber 17 must be vented to the atmosphere in order that a sufficiently large unbalanced force may be obtained to push piston 11 vigorously to the right, expelling the contents of cylinder 10. The apparatus thus far described, because of the use of burst diaphragms such as diaphragms 6, 7, 21, and 28, may be stored indefinitely in ready condition without danger of intermixture of the propellants. Another advantage of the invention is that the wall thickness of the tank may be only the minimum required for the working pressure of the tank, which is only somewhat larger than the combustion chamber pressure of the rocket motor. Conduit 13 must be of the length indicated in order that under accelerating conditions fluid 12 may be conveyed to contact with the contents of tank 4 at all times during the flight of the missile before the contents of tank 4 are exhausted. At all times in flight, while the rocket motor is supplying thrust to the missile, the effective force due to acceleration keeps the propellants aft in the tank, with the ullage forward. Injector 14 and conduit 13 are therefore termed a subsurface injector since the desired result is the injection of the hypergolic fuel beneath the surface of the oxidizer contained in the main tank. The subsurface injector must, however, be removed somewhat from the vicinity of the injector to prevent gases from the reaction of the injected fluid with the fuel in tank 4 from entering the injectors and thus disturbing the mixture ratio of the propellants in the rocket motor. The walls of collapsible bag 5 are very thin, thus effecting a considerable saving of weight and space over any system requiring separate tanks with separate pressurization schemes.

Referring now to Fig. 7, there is shown a second embodiment of the invention. Rocket motor wall 50 slides inside tank 51, bearing on sleeve 52 and piston 53. Sleeve 52 is screwed into adaptor 52a which is attached to tank 51. Chamber 54 of annular shape contains a fluid hypergolic with the propellant contained in tank 51. Expulsion of fluid contained in chamber 54 is accomplished through conduit 55 and injector 56, which is similar to injector 14 shown in Fig. 4, by the action of Belleville spring 58 held in cocked position before firing by pin 59. Upon removal of pin 59, rocket motor 50 slides aft under the compressive force of Belleville spring 58, causing fluid contained in chamber 54 to be injected into propellent tank 51. Propellant from tank 51 is prevented from mixture with the contents of chamber 54 by a burst diaphragm in injector 56 similar to burst diaphragm 28 in Fig. 5, which is ruptured upon release of Belleville spring 58. After a small amount of fluid contained in chamber 54 has been injected into tank 51 the tank pressure increases sufficiently to continue the movement of rocket motor 50 to the right in Fig. 7. The Belleville spring therefore provides only the initial impulse required to start the flow of the hypergolic fluid in chamber 54. After flow has begun, the action is self-supporting until all the contents of chamber 54 has been injected into the tank. In some instances it may be desirable or necessary, in view of the launching equipment for the missile, that no control apparatus project from the side of the missile. In that case it is necessary to keep Belleville spring 58 in cocked position by means other than pin 59. If it is permissible to initiate firing of the missile from the tail end thereof, Belleville spring 58 may be held in compression by tension rod 107 which exerts a force to the left in Fig. 7 upon injector wall 108. Tension rod 107 is, in turn, held in place by bracket 109 attached to the mouth of rocket motor 50. A powder charge 110 is placed around tension rod 107 and is detonated by the application of current through lead 112 to heater element 111. The resultant explosion breaks tension rod 107 and bracket 109 and allows them to be blown clear by the rocket motor blast. This embodiment of the invention has the advantage that all space involved is filled with fluid, and that no free space vented to the atmosphere exists.

Figure 8:
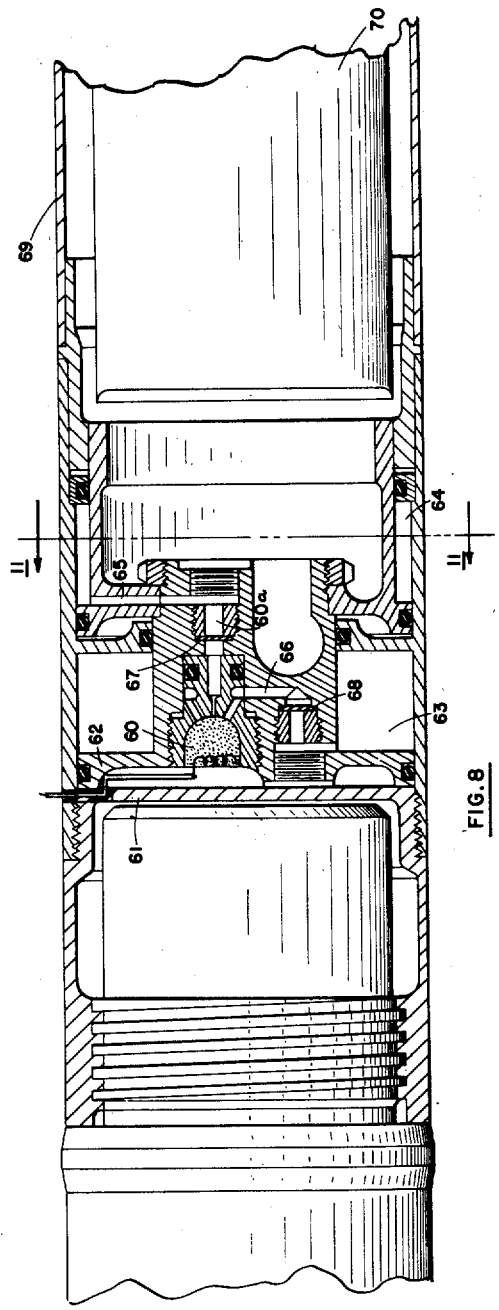
Fig. 8 is a sectional view of a third embodiment of the invention.
Figure 11:
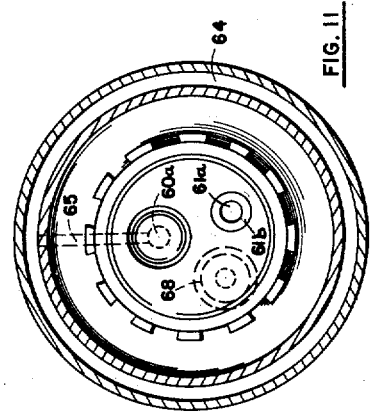
Fig. 11 is a sectional view taken at 11—11 in Fig. 8.

Referring now to Figs. 8 and 11, there is shown a third embodiment of the invention which does not require that the fluids—the ignition of which pressurizes the propellant tank—be hypergolic. A powder charge is ignited in combustion chamber 60, causing separation of bulkhead 61 and piston 62. Relative motion of bulkhead 61 and piston 62 causes the expulsion of fluid from annular chamber 63 and annular chamber 64 into chamber 60 via conduits 65 and 66. Burst diaphragms 67 and 68 prevent intermixing of these two fluids prior to the explosion of the powder charge in chamber 60. Explosion of the powder charge causes bulkhead 61 and the warhead to which it is integrally attached to travel to the left with respect to the rest of the missile, and forces fluids contained in chambers 63 and 64 to be discharged into chamber 60 through conduits 66 and 66a, where they burn, causing further relative movement of bulkhead 61 and piston 62. Burst diaphragms 67 and 68 are ruptured by pressures created in chambers 63 and 64 immediately after burning the initial powder charge which causes the movement of piston 62, and the interior of tank 69 and the exterior of collapsible bag 70 are pressurized by communication of the burnt gases from chamber 60 through conduit 61b shown in Fig. 11. Burst diaphragm 61a is broken as soon as pressure in chamber 60 exceeds the allowable value of the diaphragm. The propellants are thus pressurized in the same manner, and the rocket motor is caused to operate in the same manner as described in connection with Fig. 1.

Referring now to Fig. 9, there is shown a fourth embodiment of the invention, incorporating the advantages of the device shown in Fig. 8 and functioning upon the principle disclosed in connection with Fig. 2. In this embodiment of the invention, the warhead 71 of the missile slides forward to release a small quantity of fluid hypergolic with one of the propellants through the main tank 72. Sleeve 73, incorporating annular piston 74, is attached to warhead 71 and is free to slide on bulkhead 75 attached to the wall of main tank 72. Piston 76, slidable in sleeve 73, is attached to bulkhead 75 and incorporates chamber 77 which feeds sub-surface injector 78 similar in design to the injector shown in Fig. 4. Chamber 79, open at its aft end to main tank 72, communicates through piston 76 to chamber 80 containing Belleville spring 81. Piston 74 is held in the position shown, prior to firing of the missile, by means of tension member 82 releasable through the combustion chamber of the missile. When this tension member is released, expansion of Belleville spring 81 causes relative movement of pistons 76 and 74 toward each other, ejecting fluid from the space between them into main tank 72 through injector 78. Since the fluid contained between the pistons is hypergolic with the fluid in tank 72, combustion occurs, pressurizing tank 72 and rupturing burst diaphragm 83. After burst diaphragm 83 is ruptured, the pressure in tank 72 is communicated to chamber 80, forcing piston 76 aft with respect to the warhead, or, conversely, pushing the warhead forward, injecting more fluid through injector 78. Main tank 72 is therefore pressurized as is flexible tank 84.

In Fig. 10 there is shown a fifth embodiment of the invention, in which the injector slides aft into the combustion chamber of the rocket motor in the process of forcing pressurizing fluid into the main tank. In Fig. 10, oxidizer is contained within main tank 85, and a fuel hypergolic with the oxidizer is contained within annular chamber 86. Piston 87 sealed to the wall of tank 85 by O ring 88 slides aft, forcing fuel in chamber 86 through conduit 89 into the oxidizing acid tank by means of a subsurface injector such as is shown in connection with the embodiment of the invention heretofore disclosed. Power for initiating movement of piston 87 and injector 90, to which it is integrally attached, is furnished by compression spring 91 which acts between piston 87 and projection 92 on the wall of tank 85. As the piston moves aft, fuel in chamber 86 is forced through conduit 89 to a subsurface injector similar to that shown in Fig. 9, into tank 85 where it reacts with the oxidizer pressurizing tank 85 and flexible fuel bag 93 contained therein. The pressure created by this reaction soon exceeds the pressure in combustion chamber 94 of the rocket motor. Hence a differential pressure exists across the injector, causing the injector and piston to move aft, expelling further fuel from chamber 86. This process continues until the injector has moved aft to stop 95, at which point all the fuel contained in chamber 86 has been expelled. The fuel and oxidizer tanks are then completely pressurized, and fuel and oxidizer are both injected into combustion chamber 94 through orifices 96, 97, 98, and 99 in injector plate 90. Spring 91 is held in compressed condition during storage of the missile by compression pin 100 bearing against injector plate 90 and wedge member 101. Wedge member 101 incorporates cylindrical burst chamber 102 containing a powder charge 103, which is detonated by heater element 104 to which electrical current is supplied through leads 105 and 106. When the missile is ready for firing, therefore, current is applied to leads 105 and 106, and powder charge 103 is detonated, breaking wedge 101 and allowing compression member 100 to be displaced by spring 91 to the right in Fig. 10. As soon as combustion is initiated in combustion chamber 94, compression member 100 and the remaining parts of wedge member 101 are blown out of the throat of the rocket motor. This embodiment of the invention has the advantage that the differential pressure required to expel hypergolic fuel contained in chamber 86 is furnished by virtue of the fact that the injector is free to move into the combustion chamber; consequently no waste space is required as in the embodiment of the invention shown in Fig. 2, where a certain amount of effective space must be vented to the atmosphere in order to create the differential pressure necessary to actuate the piston. Combustion chamber 94 is effectively shortened somewhat, due to movement of the injector, but it has been established that this has no disadvantageous effect upon the performance of the rocket motor.

For purposes of explanation, the embodiments of the invention disclosed herein can be divided into two main categories—the first being characterized by subsurface injection of a small quantity of a hypergolic fuel into the main oxidizer tank, as in Figs. 4, 5, 6, 7, 9, and 10, and the second being characterized by the injection of both fuel and acid into a separate combustion chamber communicable with the main propellent tank, as in Fig. 8. Both first and second main types may be further divided into systems characterized by a differential area piston operating against an air space vented to the atmosphere, and differential pistons operating between pressure in the main tank and the pressure existent on either end of the main tank, i. e., either the combustion chamber pressure or the air pressure existent ahead of the missile. Each embodiment has advantages which may be realized to greater or lesser extent, depending upon other design parameters of the particular missile whose tanks it is desired to pressurize. All of these systems operate upon a common principle which is that a part of the energy of the propellants themselves is used for the purpose of pressurizing the tanks. In all the embodiments shown, pressurization may be applied either to the outer tank with consequent shrinking and pressurization of the inner tank, or to the inner tank with consequent stretching of the inner tank and pressurization of the outer tank.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A rocket propelled missile comprising a rocket motor combustion chamber, an injector for transmitting propellants to said combustion chamber, and a rocket motor throat section for developing thrust by means of exhaust gases; an outer rigid propellent tank for containing a liquid propellant, an inner flexible propellent tank situated within said outer tank for containing a second propellant, and means utilizing stored energy for pressurizing one of said tanks to thereby cause flow of both propellants through said injector into said combustion chamber.

2. A device as recited in claim 1 in which said pressurizing means comprises a second combustion chamber, means for initiating flow of a limited amount of said propellants into said second combustion chamber, means for igniting the propellants in said second combustion chamber, and means for communicating the pressure in said second combustion chamber to one of said tanks to thereby pressurize said propellants.

3. A device as recited in claim 1 in which said pressurizing means comprises a cylinder containing a fluid hypergolic with the propellant contained in said outer tank, a piston arranged to force said hypergolic fluid into said outer tank, a spring for storing energy to move said piston, and a burst diaphragm between said cylinder and said outer tank rupturable upon release of said spring to thereby pressurize said propellants.

4. In a liquid propelled rocket missile, a rocket motor, a main fuel tank having rigid structural walls, a second propellent tank within said main tank having flexible walls, conduit means connecting said tanks to said rocket motor, and means for pressurizing said main tank to thereby pressurize said second tank to force propellants contained in said tanks into said rocket motor.

5. A device as recited in claim 4 in which said means for pressurization comprises a chamber filled with a fluid hypergolic with the propellant in one of said tanks, and means for injecting said hypergolic fluid into said one tank to thereby pressurize both said tanks by combustion of said hypergolic fluid and said propellant.

6. A rocket missile comprising a rocket motor including a combustion chamber, a thrust-producing throat section and propellent injectors for introducing propellants into said combustion chamber, a cylindrical tank forming the body of said missile and containing a fluid propellant, said tank communicating with at least one of said propellent injectors, a second tank within said cylindrical tank having flexible walls sealed from the contents of said cylindrical tank and containing a second propellant, means connecting said second tank to at least one of said propellent injectors and stored energy means for pressurizing said cylindrical tank to thereby pressurize said second tank, forcing both said propellants into the combustion chamber of said rocket motor.

7. A device as recited in claim 6 in which said means for pressurizing comprises a cylinder filled with a fluid hypergolic with the contents of said cylindrical tank, a piston fitted to said cylinder and adapted to expel the contents of said cylinder into said cylindrical tank in response to pressure in said cylindrical tank, and means for initiating movement of said piston to thereby expel said hypergolic fluid into said tank, pressurizing said tank and causing further movement of said piston and further expulsion of said hypergolic fluid.

8. A device as recited in claim 6 in which said means for pressurizing comprises a cylinder, a fluid contained within said cylinder which is hypergolic with the propellant contained in said cylindrical tank, and a spring for actuating said piston to force said hypergolic fluid in said cylinder into said cylindrical tank to thereby pressurize both said tanks.

9. A rocket propelled missile comprising a rocket motor including a combustion chamber and injectors for introducing propellants into said chamber, a rigid cylindrical tank forming the mid-section of said missile and containing a liquid propellant; a collapsible bag smaller in cross-section than said cylindrical tank, contained within said cylindrical tank; a burst diaphragm separating the contents of said cylindrical tank from said injectors; a second burst diaphragm separating the contents of said collapsible bag from said injectors; and means for pressurizing the interior of said cylindrical tank to thereby rupture said burst diaphragms and force propellants into said combustion chamber.

10. A device as recited in claim 9 in which said pressurization means comprises a cylinder, a differential area piston separating the contents of said cylindrical tank from the contents of said cylinder and from vented air space, a fluid in said cylinder hypergolic with the propellant contained in said cylindrical tank, and powder charge means for initiating movement of said piston in the sense necessary to expel said hypergolic fluid into said cylindrical tank to thereby increase the pressure in said cylindrical tank, causing further movement of said piston and further expulsion of said hypergolic fluid pressurizing both said cylindrical tank and said collapsible tank.

11. A rocket propelled missile comprising a rocket motor including a throat section, a combustion chamber and injectors for furnishing fuel and oxidizer to said combustion chamber, a rigid cylindrical tank forming the central portion of said missile and adapted to contain liquid propellants, a burst diaphragm separating the contents of said cylindrical tank from said injectors, a collapsible elongated bag extending throughout a major portion of said cylindrical tank of cross-sectional area smaller than said cylindrical tank, a burst diaphragm separating the contents of said collapsible bag from said injectors, a solid bulkhead in the forward end of said tank, a piston fitted to the interior of the forward end of said tank adjacent to said bulkhead and movable longitudinally of said tank, a chamber associated with said piston adapted to be evacuated by motion of said piston away from said bulkhead, an explosive charge between said piston and said bulkhead, an elongated tube extending from the space aft said piston to a point near said injectors for carrying propellant displaced by said piston to the aft interior of said tank, an injector incorporating a plurality of orifices and a burst diaphragm affixed to the aft end of said tube, an annular chamber vented to the atmosphere fixed to the interior of said cylindrical tank, a second piston fixed to the aft side of said first-named piston and fitted to said annular chamber, a pressure regulator for releasing excess pressure from the explosion of said powder charge to said vented chamber, and a burst diaphragm rupturable by the explosion of said powder charge and communicating with the interior of said cylindrical tank whereby when said explosive charge is detonated said pistons move aft, said last-named diaphragm is ruptured, propellant is forced into said cylindrical chamber causing reaction with the contents thereof, expanding and forcing fuel and oxidizer from said cylindrical tank and from said collapsible bag through said injectors into the combustion chamber of said rocket motor, thereby causing propulsion of said missile.

12. In a rocket propelled missile having a thrust chamber and propellent tanks, means for pressurizing said propellent tanks comprising a container for a small quantity of fuel, a container for a small amount of an oxidizer reactable with said fuel, a combustion chamber adjacent said containers and communicating with said propellent tanks, and means for introducing said fuel and said oxidizer into said combustion chamber under conditions favorable for reaction to thereby pressurize said tanks.

13. In an artillery rocket having a rocket motor including a combustion chamber and a warhead separated by a central body section, means for providing propellants to said motor comprising a rigid cylindrical tank forming said central body section, a collapsible cylindrical tank within said first-named tank and of smaller diameter, said tanks communicating with the combustion chamber of said rocket motor by means of injector orifices, and means for injecting into said first-named tank a small amount of a fluid hypergolic with the propellant therein contained to thereby force said propellants into said rocket motor.

14. In an artillery rocket having a rocket motor and a warhead separated by a central body section, means for providing liquid propellants to said motor comprising a rigid cylindrical tank forming said central body section, a flexible elongated tank within said first-named tank and of smaller cross-sectional area, a liquid propellant in each said tank, injector means connecting said tanks to said motor, and means for pressurizing one of said tanks to thereby pressurize both said tanks and force said propellants into said rocket motor.

15. A device as recited in claim 14 in which said pressurizing means comprises a chamber containing a fluid hypergolic with one of said propellants, and means responsive to pressure in said tanks for expelling said hypergolic fluid into the one of said tanks containing said propellant with which said fluid is hypergolic to thereby pressurize said tanks and complete expulsion of said fluid into said tank.

16. A device as recited in claim 14 in which said pressurizing means comprises a cylinder for containing fluid hypergolic with the contents of one of said tanks, an injector connected with said cylinder for introducing the contents thereof into said one tank, and a piston within said cylinder responsive to pressure in said tank whereby said fluid hypergol is introduced into said one tank to thereby pressurize both said tanks and cause complete expulsion of the contents of said cylinder into said one tank.

17. In a rocket missile having fluid propellent tanks, means for pressurizing said propellent tanks comprising a closed combustion chamber adjacent said propellent tanks, a burst diaphragm separating said combustion chamber from said tanks, combustible means for raising the pressure in said chamber, two containers of fluids one of which fluids is combustible in the presence of the other, conduit means connecting said containers and said chamber, and means to decrease the volume of said containers to pressurize said fluids and to introduce said fluids through said conduit means into said chamber to thereby rupture said burst diaphragm and pressurize said tanks.

18. In a rocket missile having fluid propellent tanks, means for pressurizing said propellent tanks comprising a closed combustion chamber adjacent said propellent tanks, a burst diaphragm separating said combustion chamber from said tanks, explosive means for raising the pressure in said chamber, and injector means responsive to pressure in said combustion chamber for introducing two hypergolic fluids into said combustion chamber; said injector means comprising a cylindrical chamber filled with a fluid fuel, a first annular cylindrical chamber concentric with said cylindrical chamber and filled with a fluid hypergolic with said fluid fuel, a second annular cylindrical chamber concentric with and between said cylindrical chamber and said first annular cylindrical chamber; and interconnected pistons adapted to move in said cylindrical chambers under pressure from said combustion chamber to inject said fluids into said combustion chamber to thereby rupture said burst diaphragm and pressurize said tanks.

References Cited in the file of this patent
UNITED STATES PATENTS

| | | |
|---|---|---|
| 2,402,826 | Lubbock | June 25, 1946 |
| 2,419,866 | Wilson | Apr. 29, 1947 |